(12) United States Patent
Yamato

(10) Patent No.: US 10,516,362 B2
(45) Date of Patent: Dec. 24, 2019

(54) MOTOR DRIVING DEVICE

(71) Applicant: Rohm Co., Ltd., Kyoto (JP)

(72) Inventor: Tetsuo Yamato, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 18 days.

(21) Appl. No.: 15/460,851

(22) Filed: Mar. 16, 2017

(65) Prior Publication Data

US 2017/0272026 A1    Sep. 21, 2017

(30) Foreign Application Priority Data

Mar. 18, 2016 (JP) .................. 2016055477

(51) Int. Cl.
*H02P 29/024* (2016.01)
*H02P 29/032* (2016.01)
*B60L 3/00* (2019.01)
*H02P 6/16* (2016.01)

(52) U.S. Cl.
CPC .......... *H02P 29/024* (2013.01); *B60L 3/0061* (2013.01); *B60L 3/0076* (2013.01); *H02P 6/16* (2013.01); *H02P 29/0241* (2016.02); *H02P 29/032* (2016.02)

(58) Field of Classification Search
CPC ...... H02P 6/12; H02P 6/16; H02P 6/14; H02P 29/028
See application file for complete search history.

(56) References Cited

U.S. PATENT DOCUMENTS

| | | | | |
|---|---|---|---|---|
| 6,918,688 | B2* | 7/2005 | Ishida | B60Q 1/076 362/467 |
| 8,564,232 | B2* | 10/2013 | Sato | H02P 6/16 318/400.04 |
| 8,593,093 | B2* | 11/2013 | Hisano | H02P 29/032 318/400.01 |
| 9,742,322 | B2* | 8/2017 | Rethinam | H02P 29/028 |
| 2011/0043146 | A1 | 2/2011 | Sato | |
| 2015/0137718 | A1* | 5/2015 | Liu | G01R 23/00 318/400.03 |
| 2017/0047877 | A1* | 2/2017 | Lee | H02P 21/22 |

FOREIGN PATENT DOCUMENTS

JP     2009-201346    9/2009

* cited by examiner

*Primary Examiner* — Bickey Dhakal
(74) *Attorney, Agent, or Firm* — Fish & Richardson P.C.

(57) ABSTRACT

A motor driving device includes an abnormality detecting portion arranged to detect an abnormality of one of a plurality of position detection signals based on outputs from a plurality of Hall sensors arranged to detect a rotor position of a brushless DC motor, a measuring portion arranged to measure time between neighboring edges of a normal position detection signal when the abnormality detecting portion detects an abnormality, and a drive control portion arranged to control a drive signal for driving the brushless DC motor based on a latest time measurement result of the measuring portion.

3 Claims, 8 Drawing Sheets

MOTOR DRIVING DEVICE

CROSS-REFERENCE TO RELATED APPLICATIONS

This nonprovisional application claims priority under 35 U.S.C. § 119(a) on Patent Application No. 2016-055477 filed in Japan on Mar. 18, 2016, the entire contents of which are hereby incorporated by reference.

BACKGROUND OF THE INVENTION

Field of the Invention

The present invention relates to a motor driving device.

Description of Related Art

Conventionally, a brushless DC motor is used as a power source for various electronic equipment. The brushless DC motor includes a rotor with a permanent magnet having a plurality of magnetic poles and a stator having a plurality of slots around which coils are wound separately.

Further, the brushless DC motor is usually equipped with a plurality of Hall sensors arranged to correspond to the stators in order to detect position of the rotor with respect to the stator. As the Hall sensor, a Hall element or a Hall IC is used, for example. When controlling the brushless DC motor, a motor driving device applies a drive voltage corresponding to a position detection signal based on the Hall sensor to the motor, and hence current flows in the coils so that rotation of the motor is controlled.

However, conventionally, if even one of the plurality of Hall sensors becomes an abnormal state so that the position detection signal corresponding to the abnormal Hall sensor becomes abnormal, rotation of the motor cannot be controlled.

Therefore, JP-A-2009-201346, for example, proposes a motor driving device that can drive the motor to rotate even if an abnormality occurs in the Hall sensor.

However, JP-A-2009-201346 does not specifically disclose how to control rotational frequency of the motor when an abnormality occurs in the Hall sensor.

SUMMARY OF THE INVENTION

In view of the above situation, it is an object of the present invention to provide a motor driving device that can accurately control the rotational frequency of the brushless DC motor even if an abnormality occurs in the Hall sensor.

A motor driving device according to an aspect of the present invention includes an abnormality detecting portion arranged to detect an abnormality of one of a plurality of position detection signals based on outputs of a plurality of Hall sensors arranged to detect a rotor position of a brushless DC motor, a measuring portion arranged to measure time between neighboring edges of a normal position detection signal when the abnormality detecting portion detects an abnormality, and a drive control portion arranged to control a drive signal for driving the brushless DC motor based on a latest time measurement result of the measuring portion.

DETAILED DESCRIPTION OF THE PREFERRED EMBODIMENTS

Hereinafter, an embodiment of the present invention is described with reference to the drawings.

<Overall Structure>

Figure 1:
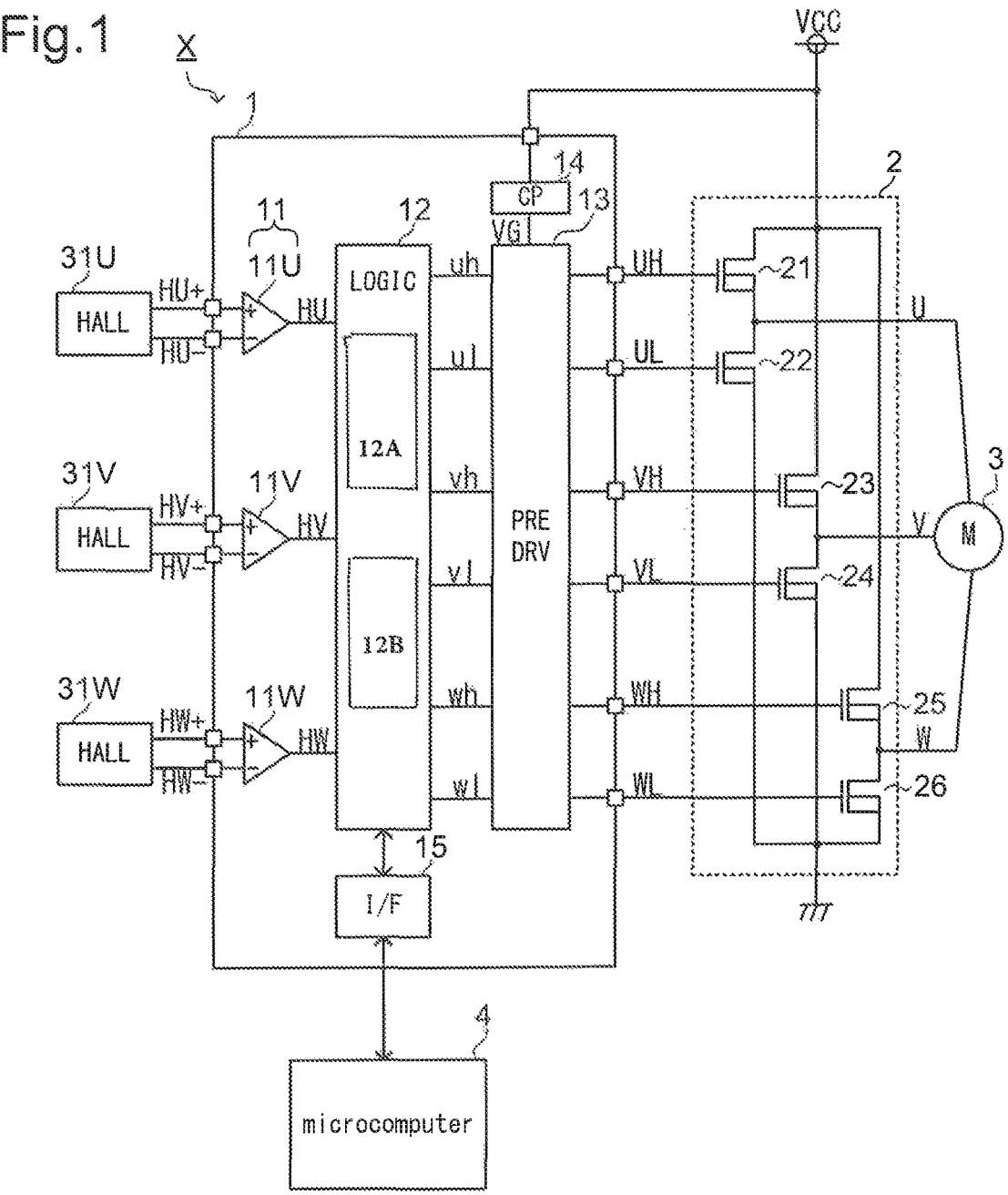
FIG. 1 is a block diagram illustrating a structure of electronic equipment according to an embodiment of the present invention.

FIG. 1 is a block diagram illustrating a structural example of electronic equipment including a three-phase brushless DC motor. Electronic equipment X of this structural example includes a semiconductor device 1, a driver 2, and a three-phase brushless DC motor 3 (hereinafter abbreviated as a motor 3). Hall elements 31U to 31W are included in the motor 3.

The semiconductor device 1 is a motor driving device that controls to drive the motor 3 (so-called motor driver IC), including a position detection signal generating portion 11, a logic portion 12, a predriver 13, a charge pump 14, and an interface 15. Note that the logic portion 12 includes measuring portions 12 (e.g., a first measuring portion 12A and a second measuring portion 12B), a drive control portion, and an abnormality detecting portion as functional portions according to the present invention.

The position detection signal generating portion 11 is a circuit block arranged to generate position detection signals (HU, HV, and HW) corresponding to a rotor position of the motor 3, including Hall comparators 11U, 11V, and 11W with hysteresis, which are disposed to correspond to phases (a U-phase, a V-phase, and a W-phase) of the motor 3, respectively. The Hall comparators 11U, 11V, and 11W differentially amplifies positive and negative Hall signals (HU+/HU−, HV+/HV−, and HW+/HW−), respectively, which are input from the Hall elements 31U, 31V, and 31W of the individual phases, so as to generate the position detection signals (HU, HV, and HW) described above.

The logic portion 12 generates predriver drive signals (uh/ul, vh/vl, and wh/wl) of the individual phases so as to perform commutation at switch timings corresponding to the position detection signals (HU, HV, and HW), and performs 180-degree energization control of the motor 3, as a basic operation. In addition, the logic portion 12 performs pulse width modulation (PWM) control of the predriver drive signals of the individual phases.

The predriver 13 performs predetermined signal processing (such as level shift processing or waveform shaping processing) on the predriver drive signals (uh/ul, vh/vl, and wh/wl) of the individual phases input from the logic portion 12, so as to generate the driver drive signals (UH/UL, VH/VL, and WH/WL) of the individual phases, and outputs the same to the driver 2 attached externally.

The charge pump 14 generates a stepped-up voltage VG (predriver power supply voltage) from a power supply voltage VCC and output the same to the predriver 13.

Note that, in the semiconductor device 1, in addition to the structural elements described above, there are integrated an inner reference voltage generating portion, a stand-by control portion, an advance angle control portion, a soft start control portion, a reference clock oscillator, a carrier frequency oscillator, various protection portions (such as an overvoltage protection portion, an overcurrent protection portion, a temperature protection portion, and a lock protection portion), but detailed description thereof is omitted here.

The driver 2 is a power output stage arranged to generate energizing signals (U, V, and W) of the individual phases in accordance with the driver drive signals (UH/UL, VH/VL, and WH/WL) of the individual phases, and includes power transistors 21 to 26 (metal oxide semiconductor field effect transistors (MOSFETs) or insulated gate bipolar transistors (IGBTs)). The drains of the upper-side power transistors 21, 23, and 25 are all connected to an application terminal of the power supply voltage VCC. The sources and the back gates of the upper-side power transistors 21, 23, and 25, and the drains of the lower-side power transistors 22, 24, and 26 are respectively connected to the individual phase terminals of the motor 3. The sources and the back gates of the lower-side power transistors 22, 24, and 26 are all connected to s ground terminal. Note that the N-channel type is used for all power transistors 21 to 26 in this structural example, but it is possible to use the P-channel type as the upper-side power transistors 21, 23, and 25. In this case, the charge pump 14 of the semiconductor device 1 can be eliminated.

Figure 2:
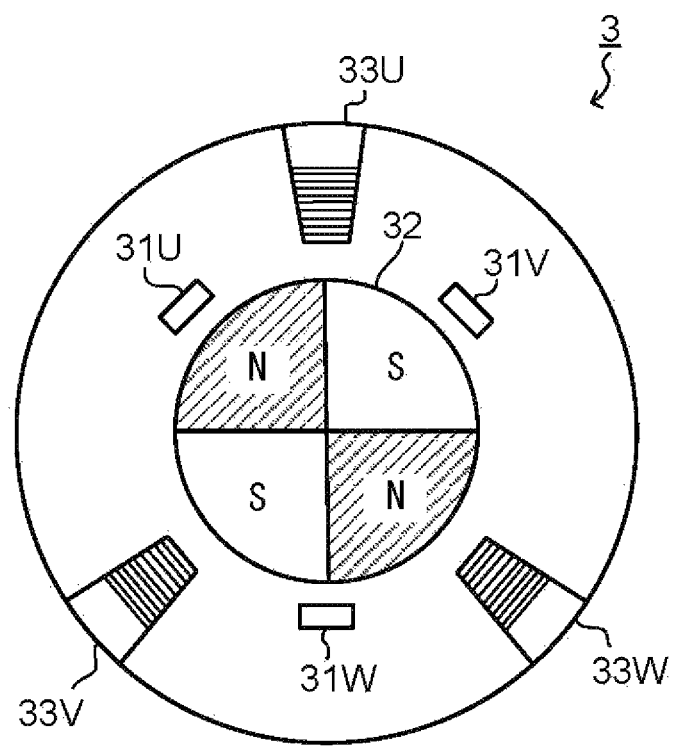
FIG. 2 is a schematic diagram illustrating an internal structure of a brushless DC motor.

As illustrated in FIG. 2, the motor 3 has a structure including a rotor 32 having a four-pole permanent magnet and three-slot stators 33U, 33V, and 33W, around each of which a coil is wound. Note that the combination of the number of poles and the number of slots is not limited to the four poles and three slots. It is possible to adopt other combination (such as two poles and three slots, or four poles and six slots).

In addition, the motor 3 is further equipped with the Hall elements 31U, 31V, and 31W of the individual phases. As illustrated in FIG. 2, the Hall elements 31U, 31V, and 31W are respectively disposed at positions to be the same electric angle phases as the stators 33U, 33V, and 33W of the individual phases, and detect the magnetic field of the rotor 32 so as to generate analog voltage signals (Hall signals). Note that it is possible to use a Hall IC that generates a rectangular wave signal instead of the Hall elements 31U, 31V, and 31W. In this case, it is possible to eliminate the Hall comparators 11U, 11V, and 11W in the semiconductor device 1. However, it is preferred to dispose the Hall comparators 11U, 11V, and 11W in the semiconductor device 1 in order to support both the Hall element and the Hall IC to be externally connected.

Note that the logic portion 12 can communicate with a microcomputer 4 via the interface 15.

<180-degree Energization Control>

Figure 3:
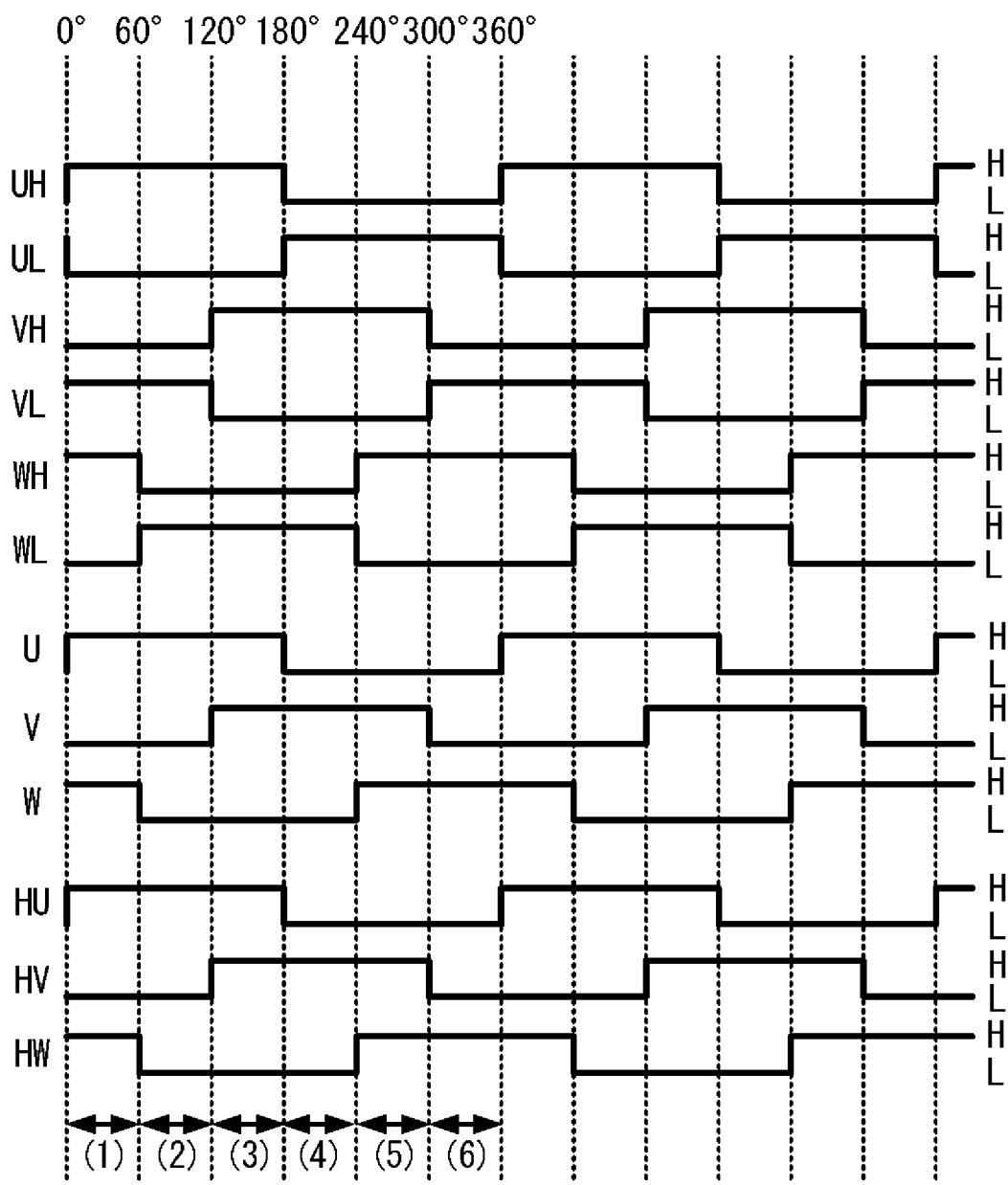
FIG. 3 is a timing chart illustrating behaviors of driver drive signals, energizing signals, and position detection signals (when the position detection signals of all phases are normal).
Figure 4:
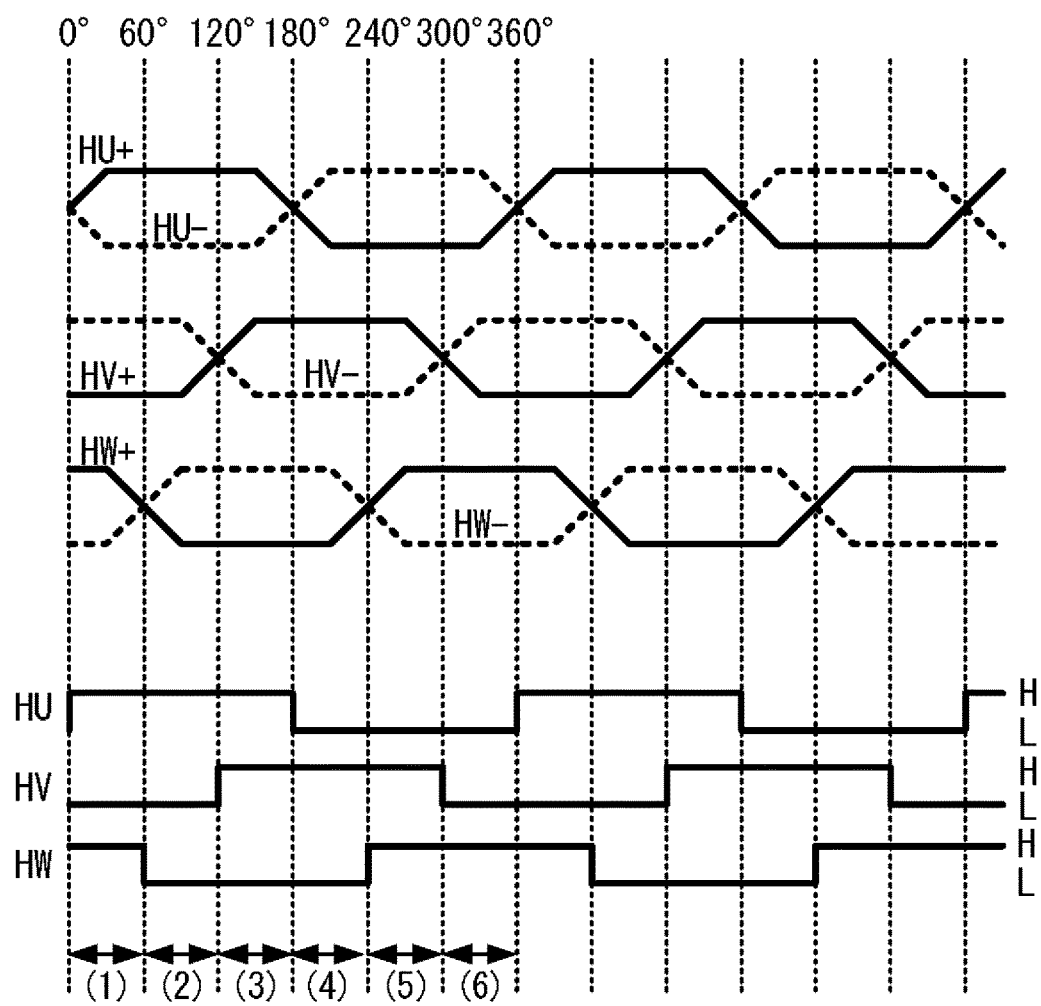
FIG. 4 is a timing chart illustrating behaviors of Hall signals and the position detection signals.

FIG. 3 is a timing chart illustrating behaviors of the driver drive signals (UH/UL, VH/VL, and WH/WL), the energizing signals (U, V, and W), and the position detection signals (HU, HV, and HW) in 180-degree energization. In addition, FIG. 4 is a timing chart illustrating behaviors of the Hall signals (HU+/HU−, HV+/HV−, and HW+/HW−) and the position detection signals (HU, HV, and HW) in the 180-degree energization.

At an electric angle of 0 to 60 degrees (phase (1)), the driver drive signals UH, VL, and WH are high level while the driver drive signals UL, VH, and WL are low level, and hence the power transistors 21, 24, and 25 are turned on, while the power transistors 22, 23, and 26 are turned off. As a result, the energizing signals U and W becomes high level, while the energizing signal V becomes low level. Therefore drive current flows in the motor 3 from the U-phase and the W-phase to the V-phase terminal. In this case, the position detection signals HU and HW become high level, while the position detection signal HV becomes low level.

At an electric angle of 60 to 120 degrees (phase (2)), the driver drive signals UH, VL, and WL are high level, while the driver drive signals UL, VH, and WH are low level, and hence the power transistors 21, 24 and 26 are turned on, while the power transistors 22, 23, and 25 are turned off. As a result, the energizing signal U becomes high level, while the energizing signals V and W become low level, and hence the drive current flows in the motor 3 from the U-phase to the V-phase and the W-phase. In this case, the position detection signal HU becomes high level, while the position detection signals HV and HW becomes low level.

At an electric angle of 120 to 180 degrees (phase (3)), the driver drive signals UH, VH, and WL are high level, while the driver drive signals UL, VL, and WH are low level, and hence the power transistors 21, 23, and 26 are turned on, while the power transistors 22, 24, and 25 are turned off. As a result, the energizing signals U and V become high level, while the energizing signal W becomes low level, and hence the drive current flows in the motor 3 from the U-phase and the V-phase to the W-phase. In this case, the position detection signals HU and HV become high level, while the position detection signal HW becomes low level.

At an electric angle of 180 to 240 degrees (phase (4)), the driver drive signals UL, VH, and WL are high level, while the driver drive signals UH, VL, and WH are low level, and hence the power transistors 22, 23, and 26 are turned on, while the power transistors 21, 24, and 25 are turned off. As a result, the energizing signal V becomes high level, while the energizing signals U and W become low level, and hence the drive current flows in the motor 3 from the V-phase to the U-phase and the W-phase. In this case, the position detection signal HV becomes high level, while the position detection signals HU and HW become low level.

At an electric angle of 240 to 300 degrees (phase (5)), the driver drive signals UL, VH, and WH are high level, while the driver drive signals UH, VL, and WL are low level, and hence the power transistors 22, 23, and 25 are turned on, while the power transistors 21, 24 and 26 are turned off. As a result, the energizing signals V and W become high level, while the energizing signal U becomes low level, and hence the drive current flows in the motor 3 from the V-phase and the W-phase to the U-phase. In this case, the position detection signals HV and HW become high level, while the position detection signal HU becomes low level.

At an electric angle of 300 to 360 degrees (phase (6)), the driver drive signals UL, VL, and WH are high level, while the driver drive signals UH, VH, and WL are low level, and hence the power transistors 22, 24, and 25 are turned on, while the power transistors 21, 23, and 26 are turned off. As a result, the energizing signal W becomes high level, while the energizing signals U and V become low level, and hence the drive current flows in the motor 3 from the W-phase to the U-phase and the V-phase. In this case, the position detection signal HW becomes high level, while the position detection signals HU and HV become low level.

In this way, in the 180-degree energization method, logic levels of the energizing signals (U, V, and W) are switched every 180 degrees while shifting the phases by 120 degrees to each other. Note that the upper-side driver drive signals UH, VH, and WH are shown as logic inversion signals of the lower-side driver drive signals UL, VL, and WL, respectively, in FIG. 3 for simple illustration, but actually, in order to prevent through current, a predetermined dead time (simultaneous off period of the upper and lower power transistors) may be provided, so that the lower-side driver drive signals UL, VL, and WL become high level after the upper-side driver drive signals UH, VH, and WH becomes low level, and that the upper-side driver drive signals UH, VH, and WH become high level after the lower-side driver drive signals UL, VL, and WL become low level.

<Rotational Frequency Control>

The above description with reference to FIGS. 3 and 4 corresponds to the case where all the Hall elements 31U, 31V, and 31W are in normal state and all the position detection signals HU and HV, HW are normal. Rotational frequency control of the motor 3 in this state is described below.

The logic portion 12 measures time from a rising edge of the position detection signal HU to a falling edge of the position detection signal HW in the period of the phase (1). Then, in the phase (2), on the basis of the time measured in the phase (1), the logic portion 12 adjusts the duties of the signals to be high level among the driver drive signals (UH/UL, VH/VL, and WH/WL). In other words, in the phase (2), the logic portion 12 adjusts the duties of the driver drive signals UH, VL, and WL to be high level in FIG. 3. The time measured in the phase (1) is the time necessary for the electric angle to advance 60 degrees, and hence a rotational frequency (rotation speed) of the motor 3 can be detected from the measured time. Therefore, it is possible to adjust the duty of the driver drive signal so that the detected rotational frequency becomes equal to a target rotational frequency. Specifically, it adjusts the duty to increase if the detected rotational frequency has not reached the target rotational frequency, for example.

The logic portion 12 measures time from a falling edge of the position detection signal HW to a rising edge of the position detection signal HV in the period of the phase (2). Then, in the phase (3), on the basis of the time measured in the phase (2), the logic portion 12 adjusts the duties of the signals to be high level among the driver drive signals (UH/UL, VH/VL, and WH/WL). In other words, in the phase (3), the logic portion 12 adjusts the duties of the driver drive signals UH, VH, and WL to be high level in FIG. 3.

After that, also in the phases (3) to (6), in the same manner as above, the logic portion 12 repeats the measurement of time between edges of the position detection signals (HU, HV, and HW) in the period of the phase, and the adjustment of the duty of the driver drive signal in the next phase based on the measured time.

With this control, it is possible to control the rotational frequency of the motor 3 in the case where all the Hall elements 31U, 31V, and 31W are in normal state.

<Rotational Frequency Control When One Hall Element is Abnormal>

In this embodiment, even if one or more of the Hall elements 31U, 31V, and 31W become an abnormal state such as breakdown so that the position detection signals (HU, HV, and HW) become abnormal, the rotational frequency control of the motor 3 can be performed. Hereinafter, this structure is described.

Figure 5:
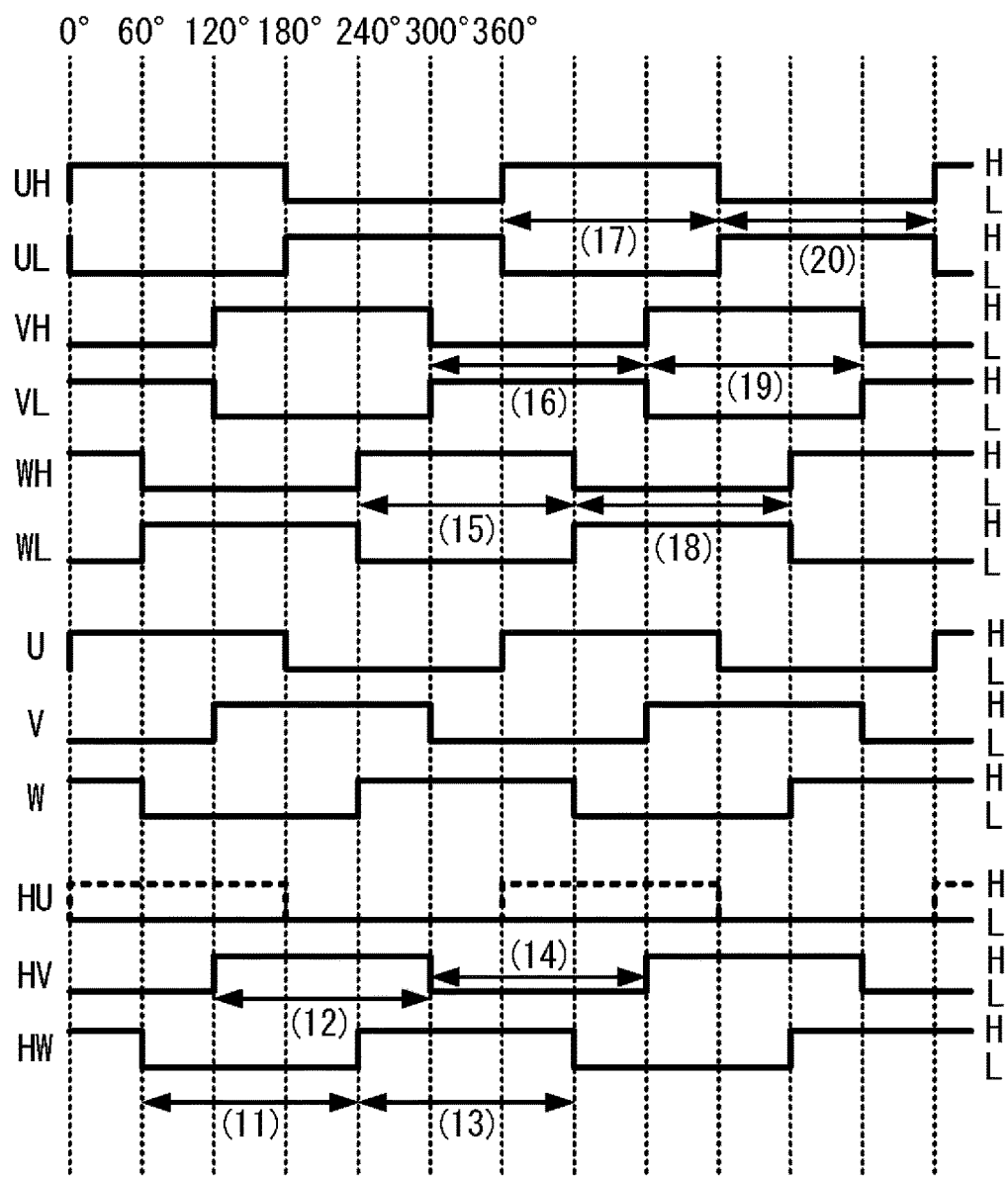
FIG. 5 is a timing chart illustrating behaviors of the driver drive signals, the energizing signals, and the position detection signals (when the position detection signal of a U-phase is abnormal).

Here, there is described the rotational frequency control in the case where one of the Hall elements 31U, 31V, and 31W becomes an abnormal state. FIG. 5 illustrates a timing chart of an example in the case where the Hall element 31U among the Hall elements becomes an abnormal state. As illustrated in FIG. 5, there is an abnormal state, in which the position detection signal HU corresponding to the Hall element 31U has no pulse and is fixed to low level.

The logic portion 12 measures time from a falling edge to a rising edge of the position detection signal HW in time period (11) illustrated in FIG. 5. When detecting the rising edge of the position detection signal HW, the logic portion 12 switches the driver drive signal WH to high level and switches the driver drive signal WL to low level so as to start output (start of time period (15)). In this case, the logic portion 12 adjusts the duty of the driver drive signal WH based on the time measured in the time period (11) (latest time measurement result). The time measured in the phase (11) is the time necessary for the electric angle to advance 180 degrees, and hence the rotational frequency (rotation speed) of the motor 3 can be detected from the measured time. Therefore, it is possible to adjust the duty of the driver drive signal so that the detected rotational frequency becomes equal to the target rotational frequency. Note that the adjustment of the duty is performed for the driver drive signal shown to be high level in FIG. 5.

The logic portion 12 measures time from rising of the position detection signal HV to falling of the position detection signal HV in time period (12) that starts during the time period (11). When detecting a falling edge of the position detection signal HV, the logic portion 12 switches the driver drive signal VH to low level and switches the driver drive signal VL to high level so as to start output (start of time period (16)). In this case, the logic portion 12 adjusts the duty of the driver drive signal VL based on the time measured in the time period (12) (latest time measurement result).

At the timing delayed from the start timing of the time period (16) by the time corresponding to an electric angle of 60 degrees, the logic portion 12 switches the driver drive signal UH to high level and switches the driver drive signal UL to low level so as to start output (start of time period (17)). The time of delay is determined by measuring time from the start timing of the time period (15) to the start timing of the time period (16) with a measuring portion 12A of the logic portion 12. In this way, even if the position detection signal HU is abnormal, level switch timing of the driver signals UH and UL can be determined. In this case, the logic portion 12 adjusts the duty of the driver drive signal UH based on the time measured in the time period (12) (latest time measurement result).

The logic portion 12 measures time from rising of the position detection signal HW to falling of the position detection signal HW in time period (13) that starts during the time period (12). When detecting a falling edge of the position detection signal HW, the logic portion 12 switches the driver drive signal WH to low level and switches the driver drive signal WL to high level so as to start output (start of time period (18)). In this case, the logic portion 12 adjusts the duty of the driver drive signal WL based on the time measured in the time period (13) (latest time measurement result).

The logic portion 12 measures time from falling of the position detection signal HV to rising of the position detection signal HV in time period (14) that starts during the time period (13). When detecting a rising edge of the position detection signal HV, the logic portion 12 switches the driver drive signal VH to high level and switches the driver drive signal VL to low level so as to start output (start of time period (19)). In this case, the logic portion 12 adjusts the duty of the driver drive signal VH based on the time measured in the time period (14) (latest time measurement result).

At the timing delayed from the start timing of the time period (19) by the time corresponding to an electric angle of 60 degrees, the logic portion 12 switches the driver drive signal UH to low level and switches the driver drive signal UL to high level so as to start output (start of time period (20)). The time of delay is determined by measuring time from the start timing of the time period (18) to the start timing of the time period (19) with the logic portion 12. In this way, even if the position detection signal HU is abnormal, level switch timing of the driver signals UH and UL can be determined. In this case, the logic portion 12 adjusts the duty of the driver drive signal UL based on the time measured in the time period (14) (latest time measurement result).

With this control, even if one of the Hall elements 31U, 31V, and 31W becomes an abnormal state such as breakdown, the rotational frequency control of the motor 3 can be performed.

<Rotational Frequency Control When Two Hall Elements Are Abnormal>

In addition, in this embodiment, even if two of the Hall elements 31U, 31V, and 31W become an abnormal state such as breakdown so that the two corresponding position detection signals become abnormal, the rotational frequency control of the motor 3 can be performed as described below.

Figure 6:
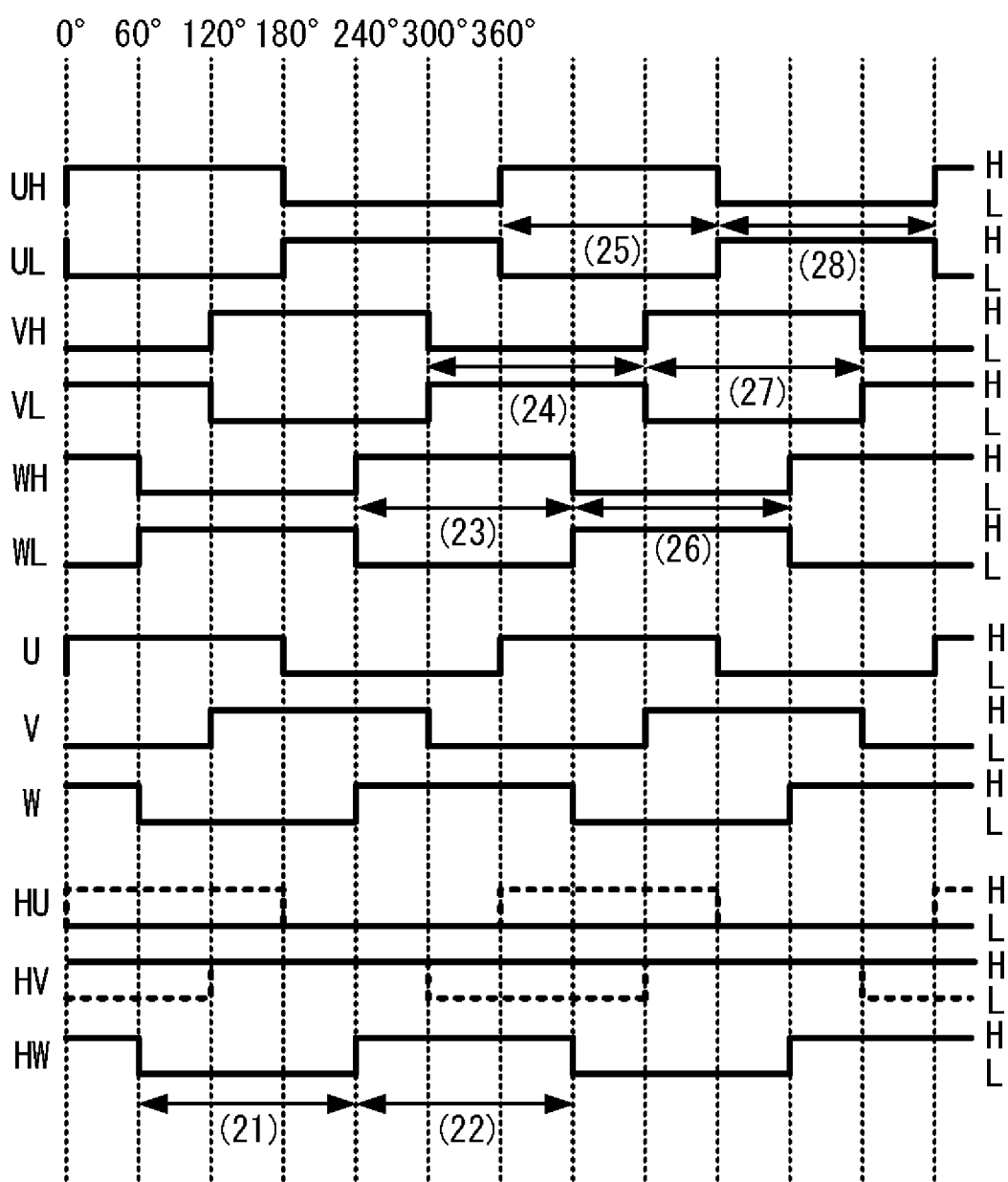
FIG. 6 is a timing chart illustrating behaviors of the driver drive signals, the energizing signals, and the position detection signals (when the position detection signals of the U-phase and a V-phase are abnormal).

FIG. 6 illustrates a timing chart of an example in the case where the Hall elements 31U and 31V among the Hall elements become an abnormal state. As illustrated in FIG. 6, there is an abnormal state, in which the position detection signals HU and HV corresponding to the Hall elements 31U and 31V have no pulses and are fixed to low level or high level.

At time period (21) illustrated in FIG. 6, the logic portion 12 measures time from a falling edge to a rising edge in the position detection signal HW. When detecting a rising edge of the position detection signal HW, the logic portion 12 switches the driver drive signal WH to high level and switches the driver drive signal WL to low level, so as to start output (start of time period (23)). In this case, the logic portion 12 adjusts the duty of the driver drive signal WH based on the time measured in the time period (21) (latest time measurement result). The time measured in phase (21) is the time necessary for the electric angle to advance 180 degrees, and hence the rotational frequency (rotation speed) of the motor 3 can be detected from the measured time. Therefore, it is possible to adjust the duty of the driver drive signal so that the detected rotational frequency becomes equal to the target rotational frequency. Note that the adjustment of the duty is performed for the driver drive signal shown to be high level in FIG. 6.

At the timing delayed from the start timing of the time period (23) by the time corresponding to an electric angle of 60 degrees, the logic portion 12 switches the driver drive signal VH to low level and switches the driver drive signal VL to high level so as to start output (start of time period (24)). Because the time measured in the time period (21) corresponds to an electric angle of 180 degrees, the time of delay is determined as one third of the measured time. In this way, even if the position detection signal HV is abnormal, level switch timing of the driver signals VH and VL can be determined. In this case, the logic portion 12 adjusts the duty of the driver drive signal VL based on the time measured in the time period (21) (latest time measurement result).

At the timing delayed from the start timing of the time period (23) by the time corresponding to an electric angle of 120 degrees, the logic portion 12 switches the driver drive signal UH to high level and switches the driver drive signal UL to low level so as to start output (start of time period (25)). Because the time measured in the time period (21) corresponds to an electric angle of 180 degrees, the time of delay is determined as two thirds of the measured time. In this way, even if the position detection signal HU is abnormal, level switch timing of the driver signals UH and UL can be determined. In this case, the logic portion 12 adjusts the duty of the driver drive signal UH based on the time measured in the time period (21) (latest time measurement result).

The logic portion 12 measures time from a rising edge to a falling edge of the position detection signal HW in time period (22). When detecting a falling edge of the position detection signal HW, the logic portion 12 switches the driver drive signal WH to low level and switches the driver drive signal WL to high level so as to start output (start of time period (26)). In this case, the logic portion 12 adjusts the duty of the driver drive signal WL based on the time measured in the time period (22) (latest time measurement result).

At the timing delayed from the start timing of the time period (26) by the time corresponding to an electric angle of 60 degrees, the logic portion 12 switches the driver drive signal VH to high level and switches the driver drive signal VL to low level so as to start output (start of time period (27)). Because the time measured in the time period (22) corresponds to an electric angle of 180 degrees, the time of delay is determines as one third of the measured time. In this way, even if the position detection signal HV is abnormal, level switch timing of the driver signals VH and VL can be determined. In this case, the logic portion 12 adjusts the duty of the driver drive signal VH based on the time measured in the time period (22) (latest time measurement result).

At the timing delayed from the start timing of the time period (26) by the time corresponding to an electric angle of 120 degrees, the logic portion 12 switches the driver drive signal UH to low level and switches the driver drive signal UL to high level so as to start output (time period (28) start of). Because the time measured in the time period (22) corresponds to an electric angle of 180 degrees, the time of delay is determined as two thirds of the measured time. In this way, even if the position detection signal HU is abnormal, level switch timing of the driver signals UH and UL can be determined. In this case, the logic portion 12 adjusts the duty of the driver drive signal UL based on the time measured in the time period (22) (latest time measurement result).

With this control, even if two of the Hall elements 31U, 31V, and 31W become an abnormal state such as breakdown, the rotational frequency of the motor 3 can be controlled.

<Control When Motor Starts>

Figure 7:
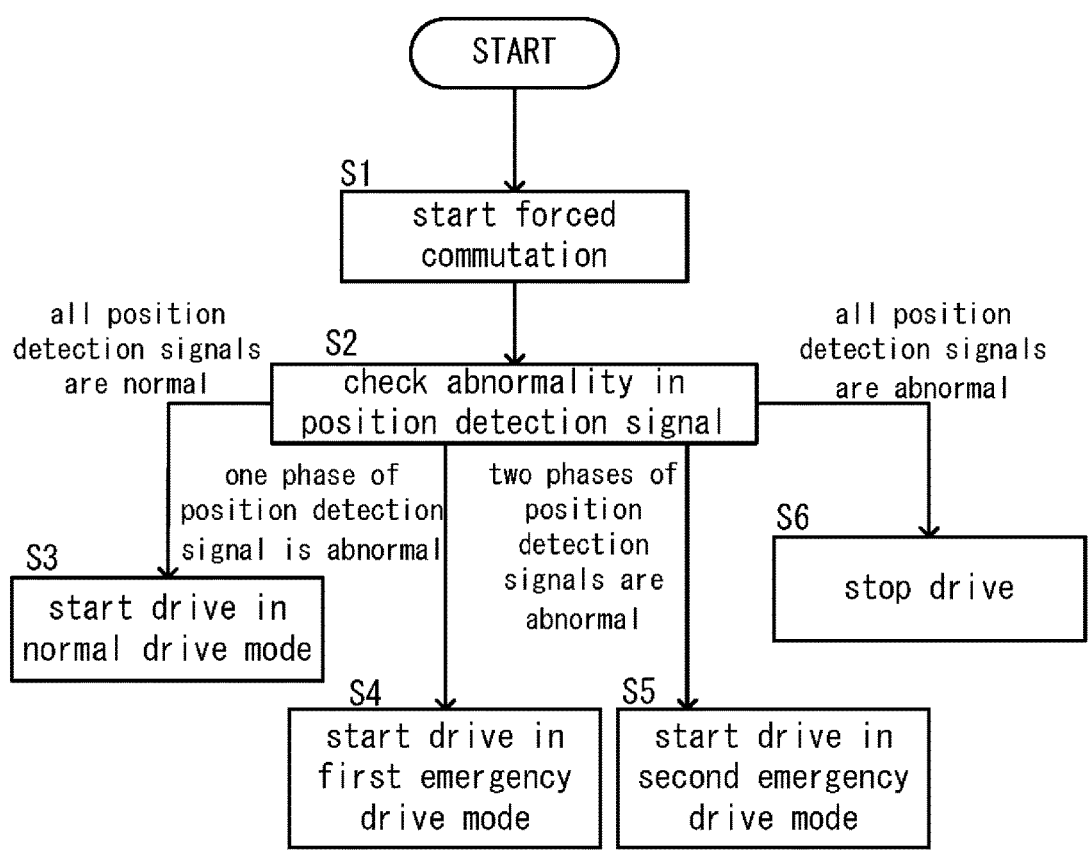
FIG. 7 is a flowchart concerning an operation when the brushless DC motor starts.

FIG. 7 is a flowchart illustrating control when the motor 3 starts by the semiconductor device 1 (motor driving device) according to this embodiment.

In the state where the rotor 32 of the motor 3 is stopped, the flowchart of FIG. 7 is started. First, in Step S1, the logic portion 12 sequentially switches an energizing pattern of the driver drive signals (UH/UL, VH/VL, and WH/WL) at switch timing corresponding to a predetermined forced commutation frequency so as to start forced commutation of the motor 3. Here, the energization is performed by a 120-degree energization method. In this method, the energizing signals (U, V, and W) of the individual phases are switched to have three states corresponding to the power supply voltage VCC, the ground potential, and an open state. The states of the power supply voltage VCC and the ground potential are respectively sustained for a period of time corresponding to an electric angle of 120 degrees.

Then, in Step S2, the logic portion 12 checks whether or not the position detection signals (HU, HV, and HW) are normal. If it is detected that a pulse is generated in every position detection signal so that every position detection signal is normal (namely all the Hall elements (31U, 31V, and 31W) are in normal state), the process proceeds to Step S3. In Step S3, the logic portion 12 changes to a normal drive mode for performing the rotational frequency control that is performed when all the Hall elements (31U, 31V, and 31W) are in normal state as described above.

On the other hand, if it is detected that one of the position detection signals (HU, HV, and HW) is abnormal (namely one of the Hall elements (31U, 31V, and 31W) is abnormal), the process proceeds to Step S4. In Step S4, the logic portion 12 changes to a first emergency drive mode for performing the rotational frequency control that is performed when one of the Hall elements (31U, 31V, and 31W) is in abnormal state as described above.

In addition, if it is detected that two of the position detection signals (HU, HV, and HW) are abnormal (namely two of the Hall elements (31U, 31V, and 31W) are abnormal), the process proceeds to Step S5. In Step S5, the logic portion 12 changes to a second emergency drive mode for performing the rotational frequency control that is performed when two of the Hall elements (31U, 31V, and 31W) are in abnormal state as described above.

In addition, if it is detected that all the position detection signals (HU, HV, and HW) are abnormal (namely if all the Hall elements (31U, 31V, and 31W) are abnormal), the process proceeds to Step S6. In Step S6, the logic portion 12 sets all the driver drive signals (UH/UL, VH/VL, and WH/WL) to low level so as to turn off all the transistors 21 to 26, and hence stops to drive the motor 3.

In this case, the logic portion 12 transmits a flag signal having a logic level (e.g. high level) indicating that all the position detection signals (HU, HV, and HW) are abnormal to the microcomputer 4 via the interface 15. In this way, it is possible to inform the microcomputer 4 of the fact that an abnormality has occurred in every Hall element. Note that, if the electronic equipment X is in-vehicle equipment, the microcomputer 4 can be included in an electronic control unit (ECU) that integrally controls various systems mounted in the vehicle, for example.

<Application to Vehicle>

Figure 8:
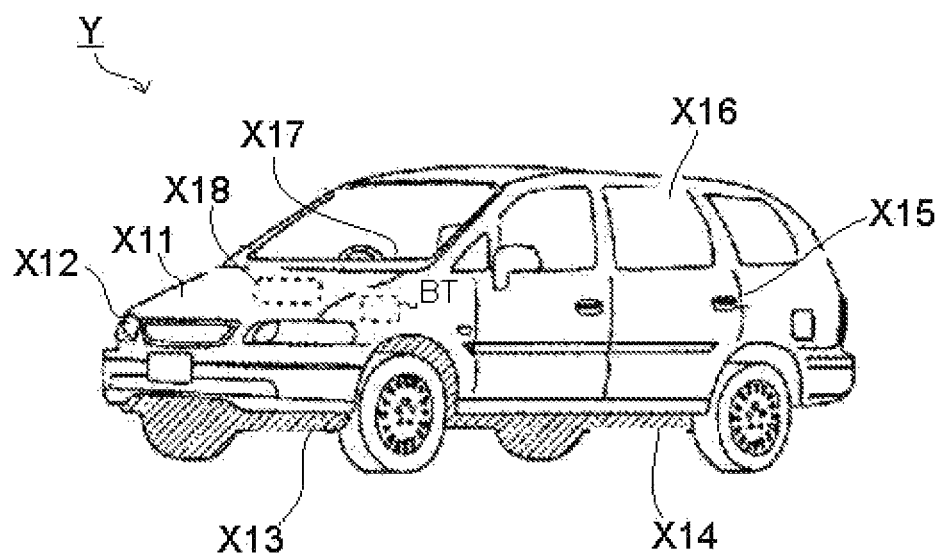
FIG. 8 is an external view illustrating a structural example of a vehicle equipped with the electronic equipment.

FIG. 8 is an external view illustrating a structural example of a vehicle equipped with various electronic equipment. A vehicle Y of this structural example is equipped with various electronic equipment X11 to X18, which operate by being supplied with power supply voltage from a battery BT. Note that mounting positions of the electronic equipment X11 to X18 in FIG. 8 may be different from real positions, for convenience of illustration.

The electronic equipment X11 is an engine control unit arranged to perform control concerning an engine (such as injection control, electronic throttle control, idling control, oxygen sensor heater control, and automatic cruise control).

The electronic equipment X12 is a lamp control unit arranged to perform on-off control of a high intensity discharged lamp (HID), a daytime running lamp (DRL), and the like.

The electronic equipment X13 is a transmission control unit arranged to perform control concerning a transmission.

The electronic equipment X14 is a body control unit arranged to perform control concerning movements of the vehicle Y (such as anti-lock brake system (ABS) control, electric power steering (EPS) control, and electronic suspension control).

The electronic equipment X15 is a security control unit arranged to perform control to drive a door lock, a security alarm, and the like.

The electronic equipment X16 is electronic equipment mounted in the vehicle Y as standard equipment or factory optional equipment at a factory shipping stage, such as an air conditioner, a wiper, an electric door mirror, a power window, a damper (shock absorber), an electric sunroof, and an electric seat.

The electronic equipment X17 is electronic equipment mounted arbitrarily in the vehicle Y as user optional equipment, such as in-vehicle audio/visual (A/V) equipment, a car navigation system, and an electronic toll collection system (ETC).

The electronic equipment X18 is electronic equipment equipped with a high voltage motor, such as an in-vehicle blower, an oil pump, a water pump, a battery cooling fan, and the like.

Among the electronic equipment X11 to X18 described above, the electronic equipment including a brushless DC motor can appropriately use the structure of the electronic equipment X and the motor control method thereof described above. For example, if the brushless DC motor is disposed in the air conditioner (electronic equipment X16), by performing the rotational frequency control of the motor according to this embodiment, even if an abnormality occurs in the Hall element, the rotational frequency control can be performed without stopping the drive of the motor, and hence it is possible to suppress a malfunction such as fogging of the windshield of the vehicle due to the stop of the motor.

In addition, particularly under current circumstances in which ISO26262 is laid down as an international standard for functional safety concerning electric and electronic equipment of vehicles, the technique of this embodiment, in which the rotational frequency control of the motor can be performed even if an abnormality occurs in the Hall element, is important for safety.

<Other Variations>

Note that various technical features disclosed in this specification can be variously modified within the scope of the concept of the technical invention without deviating therefrom, in addition to the embodiment described above. For example, the motor driving device can be used not only for the vehicle application but also for various applications (such as home appliances). In addition, other than the 180-degree energization method, a 150-degree energization method or the like can be considered.

In this way, the embodiment described above is merely an example in every aspect and should not be interpreted as a limitation. The technical scope of the present invention should be defined not by the above description of the embodiment but by the claims and should be understood to include all modifications within meaning and scope equivalent to the claims.

What is claimed is:

1. A motor driving device comprising:
an abnormality detecting portion arranged to detect an abnormality of two of three position detection signals based on outputs of three Hall sensors arranged to detect a rotor position of a three-phase brushless DC motor;
a measuring portion arranged to measure time between neighboring edges of a normal position detection signal to thereby detect a rotation speed of the brushless DC motor if the abnormality detecting portion detects an abnormality; and
a drive control portion arranged to control a drive signal for driving the brushless DC motor based on a most recent time measurement result of the measuring portion prior to control of the drive signal,
wherein the motor driving device is operable such that:
when the abnormality detecting portion detects abnormalities of a U-phase position detection signal HU and a V-phase position detection signal HV, the measuring portion measures a measured time which is a time from a falling edge to a rising edge of a W-phase position detection signal HW, and on detection of the rising edge of the W-phase position detection signal HW, the drive control portion switches a drive signal WH for driving a W-phase upper-side transistor to high level and a drive signal WL for driving a W-phase lower-side transistor to low level, and adjusts a duty of the drive signal WH based on the measured time,
at a time point delayed from a first time point at which the drive signal WH is switched to high level and the drive signal WL is switched to low level by a time corresponding to an electric angle of 60° determined as one-third of the measured time, the drive control portion switches a drive signal VH for driving a V-phase upper-side transistor to low level and a drive signal VL for driving a V-phase lower-side transistor to high level, and adjusts a duty of the drive signal VL based on the measured time, and
at a time point delayed from the first time point by a time corresponding to an electric angle of 120° determined as two-thirds of the measured time, the drive control portion switches a drive signal UH for driving a U-phase upper-side transistor to high level and a drive signal UL for driving a U-phase lower-side transistor to low level, and adjusts a duty of the drive signal UH based on the measured time.

2. The motor driving device according to claim 1, wherein the abnormality detecting portion detects an abnormality in forced commutation for starting the brushless DC motor by energizing the brushless DC motor in a stopped state, and
the forced commutation is performed by switching energizing signals of individual phases among a power supply voltage state, a ground potential state, and an open state according to a predetermined forced commutation frequency.

3. In-vehicle electronic equipment comprising:
a three-phase brushless DC motor; and
a motor driving device arranged to control to drive the brushless DC motor, the motor driving device comprising:
an abnormality detecting portion arranged to detect an abnormality of two of three position detection signals based on outputs of three Hall sensors arranged to detect a rotor position of the three-phase brushless DC motor;
a measuring portion arranged to measure time between neighboring edges of a normal position detection signal to thereby detect a rotation speed of the brushless DC motor if the abnormality detecting portion detects an abnormality; and
a drive control portion arranged to control a drive signal for driving the brushless DC motor based on a most recent time measurement result of the measuring portion prior to control of the drive signal,
wherein the motor driving device is operable such that:
when the abnormality detecting portion detects abnormalities of a U-phase position detection signal HU and a V-phase position detection signal HV, the measuring portion measures a measured time which is a time from a falling edge to a rising edge of a W-phase position detection signal HW, and on detection of the rising edge of the W-phase position detection signal HW, the drive control portion switches a drive signal WH for driving a W-phase upper-side transistor to high level and a drive signal WL for driving a W-phase lower-side transistor to low level, and adjusts a duty of the drive signal WH based on the measured time,
at a time point delayed from a first time point at which the drive signal WH is switched to high level and the drive signal WL is switched to low level by a time corresponding to an electric angle of 60° determined as one-third of the measured time, the drive control portion switches a drive signal VH for driving a V-phase upper-side transistor to low level and a drive signal VL for driving a V-phase lower-side transistor to high level, and adjusts a duty of the drive signal VL based on the measured time, and
at a time point delayed from the first time point by a time corresponding to an electric angle of 120° determined as two-thirds of the measured time, the drive control portion switches a drive signal UH for driving a U-phase upper-side transistor to high level and a drive signal UL for driving a U-phase lower-side transistor to low level, and adjusts a duty of the drive signal UH based on the measured time.

* * * * *